United States Patent [19]
Gazzard et al.

[11] 3,947,607
[45] Mar. 30, 1976

[54] METHOD FOR REINFORCING PISTONS

[75] Inventors: Simon Thomas Gazzard, New Milton; Harold Taylor Hill, Lymington, both of England

[73] Assignee: Wellworthy Limited, New Milton, England

[22] Filed: May 13, 1974

[21] Appl. No.: 469,465

[30] Foreign Application Priority Data
May 25, 1973  United Kingdom............... 25318/73
Oct. 12, 1973  United Kingdom............... 47845/73

[52] U.S. Cl................ 427/37; 219/76; 219/121 P; 427/34; 427/405; 427/423
[51] Int. Cl.²............................................ B05D 1/08
[58] Field of Search...... 117/93.1 PF, 93.1 R, 71 M, 117/105.2, 131; 219/76, 121 P; 427/34, 37, 423, 405

[56] References Cited
UNITED STATES PATENTS

| | | | |
|---|---|---|---|
| 2,793,571 | 5/1957 | Way et al.......................... | 117/71 M |
| 2,833,668 | 5/1958 | Dailey et al...................... | 117/50 |
| 3,017,119 | 1/1962 | Gibson........................ | 117/93.1 PF |
| 3,041,194 | 6/1962 | Rosen et al...................... | 117/38 |
| 3,347,698 | 10/1967 | Ingham....................... | 117/93.1 PF |

*Primary Examiner*—J. H. Newsome
*Attorney, Agent, or Firm*—Brisebois & Kruger

[57] ABSTRACT

A deposit of a reinforcing material is formed on an aluminium alloy piston by spraying one or more regions of the piston with a copper-based material from an electric-arc spray gun which produces molten particles of a heat content sufficient to produce an effective metallurgical interaction with the piston alloy so that the copper-based material is bonded to the region or regions of the piston.

11 Claims, 5 Drawing Figures

METHOD FOR REINFORCING PISTONS

SUBJECT OF THE INVENTION

The present invention relates to pistons, and more particularly to a method for reinforcing one or more areas of an aluminium alloy piston with a wear-resistant material.

DESCRIPTION OF THE PRIOR ART

It has been proposed hitherto to reinforce areas of an aluminium alloy piston such as the piston skirt, lands, or ring grooves by spraying on wear-resistant metal such as stainless steel, usually by means of an oxygen/combustion fas metallising gun. In order to obtain a satisfactory deposit it has hitherto been the practice first to pre-heat the surface to an elevated temperature in excess of 150°C and initially to spray a coating of a bonding material in order to provide good adhesion for a subsequently sprayed deposit of a hard-wearing material. It has also been proposed to apply a coating of, for instance, stainless steel to an aluminium alloy by spraying the material directly onto a surface, pre-heated to at least 150°C, with a metallising gun operated with an excess of oxygen, or by applying stainless steel in liquid form directly to a surface preheated to at least 315°C and relying on a high degree of pre-heat alone to ensure satisfactory bonding.

SUMMARY OF THE INVENTION

The present invention provides a method of forming a deposit of an reinforcing material on a aluminium alloy piston which includes the step of spraying one or more regions of the piston with a copper-based material from an electric-arc spray gun which produces molten particles of a size, velocity and heat content sufficient to produce an effective metallurgical interaction with the piston alloy so that the copper-based material is bonded to said one or more regions of the piston.

It has been found that a good bond to the piston can be achieved according to the method of the invention without the necessity to first substantially pre-heat the piston.

The reinforcing material may be applied in a single spraying operation, without a separate bond coating, in which case the spraying parameters of the electric-arc spray gun are varied during the spraying process so that the initially sprayed material is deposited under conditions leading to good adhesion to the piston alloy, and the subsequent portion of the deposit is sprayed under conditions providing good inter-particle cohesion, machinability and wear-resistance.

Alternatively, the spraying operation may be carried out in two stages in which case the initially deposited material is applied with an electric-arc gun operated under conditions leading to a bond coat having good adhesion to the piston, and the subsequent deposit is applied by any spraying process capable of providing a deposit with suitable cohesive and wear-resisting characteristics.

Preferably the electric-arc spray gun includes two consumable wires of the metallic material to be sprayed which are connected to an electrical power source and disposed such that an arc is struck between the wires, and the molten metal produced by the arc is atomised by a blast of gas, such as compressed air, from a nozzle situated behind the arc, and the atomised metal particles are projected onto the surface region or regions of the piston to be coated.

The initial coating layer on the piston is sprayed at a relatively high voltage and/or relatively low air pressure in order to provide a high bond strength to the surface of the piston, whilst the subsequent layer or layers may be electric-arc sprayed at a relatively lower voltage and/or higher air pressure. Alternatively, the subsequent layer or layers may be applied by means of a different spraying process, such as the plasma-arc process or the oxygen/combustion gas metallising process, and may then be of a different material from that of the initially-applied layer.

If desired, the piston may be warmed prior to the spraying of the coating, typically to 75°–125°C. This may be advantageous in order to ensure the removal of surface contaminants, such as moisture, and may also reduce the stress in the final coating. It is, however, a feature of this invention that substantial pre-heating of the piston in order to secure satisfactory bonding of the bond coat or wear-resisting deposit is not required.

After the spraying operation is completed, excess material is removed by grinding or machining and, where the spraying is carried out in the region of the ring groove, the ring groove is machined or ground into or through the deposit.

In a preferred form of carrying out the method of the invention, one electrode of the electric-arc spray gun, preferably the anode, is copper-based alloy which exhibits a high bond strength to an aluminium alloy piston when sprayed with a relatively high voltage and/or relatively low air pressure. This alloy may be phosphor or aluminium bronze, copper chromium, or cupro-nickel, The other electrode may also be of a non-ferrous alloy but is preferably of steel, which may be a low alloy or a stainless steel. Where dissimilar materials are used the resulting deposit consists of a physical mixture of the two component materials, forming what is known as a pseudo-alloy. Such composites exhibit good machining characteristics and may also offer better reinforcement of a piston ring groove than either component material alone. For instance, the wear resistance of a steel may be combined with the good bearing properties of a bronze. However, both anode and cathode may, alternatively, be of a stainless steel or a low-alloy steel.

More specifically an aluminium-alloy piston to be provided with one or more reinforced ring grooves is recessed on its periphery in the region where the groove or grooves are to be formed and is degreased and mechanically roughened, for example, by grit-blasting. Where appropriate, the piston is then warmed in the region to be reinforced, usually to a temperature of at least 75°C, in order to remove surface contaminants and/or to reduce residual stress in the coating. The spray deposit is then applied by one or more spray guns whilst the piston is rotated about its axis.

In the single-stage process the initially deposited layer is electric-arc sprayed at a relatively high arc voltage and/or a relatively low air pressure, and subsequent layers are sprayed at a relatively lower voltage and/or a relatively higher air pressure. The spraying operation may be carried out with either a single electric-arc spray gun or a plurality of electric-arc spray guns operating together, or alternatively with a series of single guns or groups of guns operating in succession.

In the two-stage process a bond layer is applied with a single electric-arc spray gun or a plurality of electric-arc spray guns operating together or in succession. Each such gun is operated under conditions favouring a high bond strength, in particular a relatively high arc voltage and/or a relatively low air pressure, and a coat of 0.002–0.008 in (0.05–0.20 mm) thickness is typically applied. A hard wearing reinforcement of a suitable ferrous or non-ferrous alloy, or of a pseudo-alloy, is then applied by means of an electric-arc gun, a plasma-arc gun, or an oxygen/combustion-gas metallising gun, or by means of a plurality of such guns operating together or in succession.

After completion of the spraying process, the excess material is then removed by grinding or machining and the ring groove machined or ground into or through the deposit. Other regions of the piston periphery may also be reinforced in a similar manner.

Where only a single gun or a series of single guns is employed for the spraying operation, it is preferable that the gun be oscillated so as to incline it to the piston at a continuously varying angle throughout the spraying operation, in order to ensure good adhesion over the whole region to be sprayed and a high density of the deposited reinforcement. Alternatively, the piston itself is oscillated. Similarly, where two or more spray guns are used, they are preferably inclined to the region to be sprayed at different angles. Whether a single gun or a plurality of guns is used, the piston is rotated continuously on its axis and may also be reciprocated along its axis, continuously or intermittently.

BRIEF DESCRIPTION OF THE DRAWINGS

The method of carrying out the invention will now be further described, by way of example, with reference to the accompanying drawings, in which.

DESCRIPTION OF THE PREFERRED EMBODIMENTS

Figure 1:
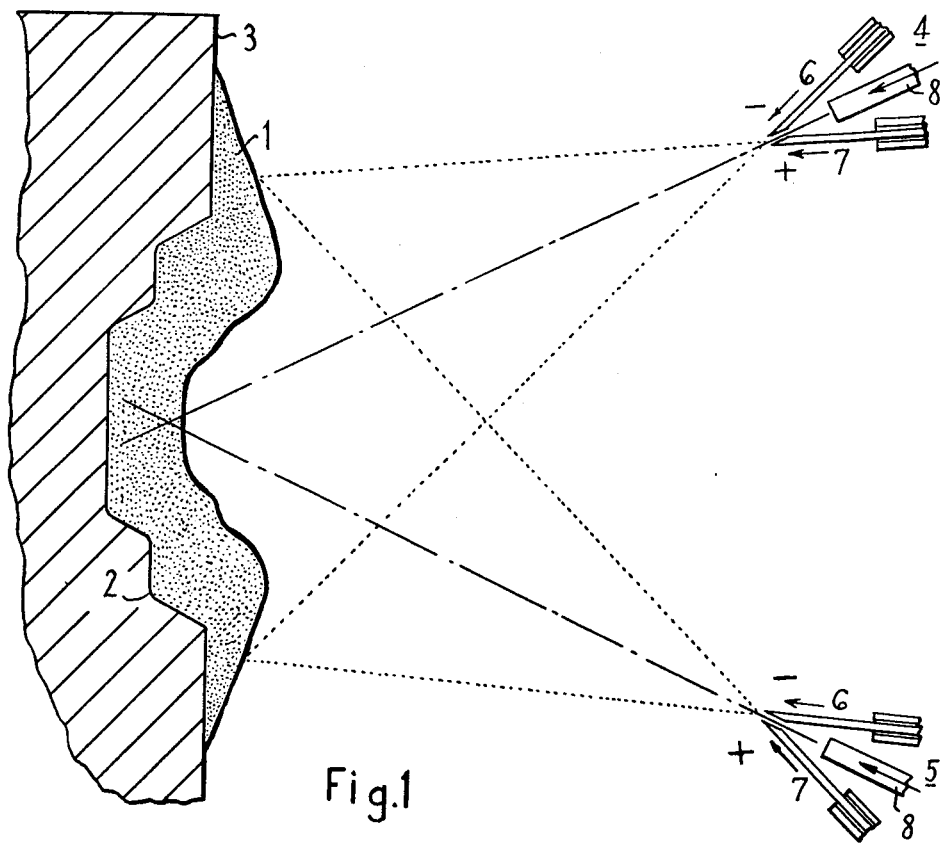
FIG. 1 is a diagram illustrating one manner of carrying out the method according to the invention.

Referring to FIG. 1, a sprayed-on coating 1 of wear resistant metal is deposited in a stepped recess 2 in the wall of an aluminium-alloy piston 3. The coating material is sprayed from two electric-arc spray guns, generally indicated at 4 and 5, wherein the electric-arc is struck between a cathode wire 6 and an anode wire 7, the wires being connected to a D.C. voltage source (not shown). The molten metal produced from the electrodes by the arc between them is dispersed into particles of high heat content and projected on to the region of the piston to be coated by means of compressed air fed through the nozzle 8 located behind the arcs. The arc voltages and air pressure may be varied during the spraying operation as previously described in order to control the particle size and velocity. The piston is rotated about its awis and the spqay guns are inclined and/or oscillated during a spraying operation, also as previously described. Subsequent to the spraying on of the deposit of wear resistant metal, the ring groove is cut into or through the deposit.

Figures 2A, 2B, 2C, 2D:
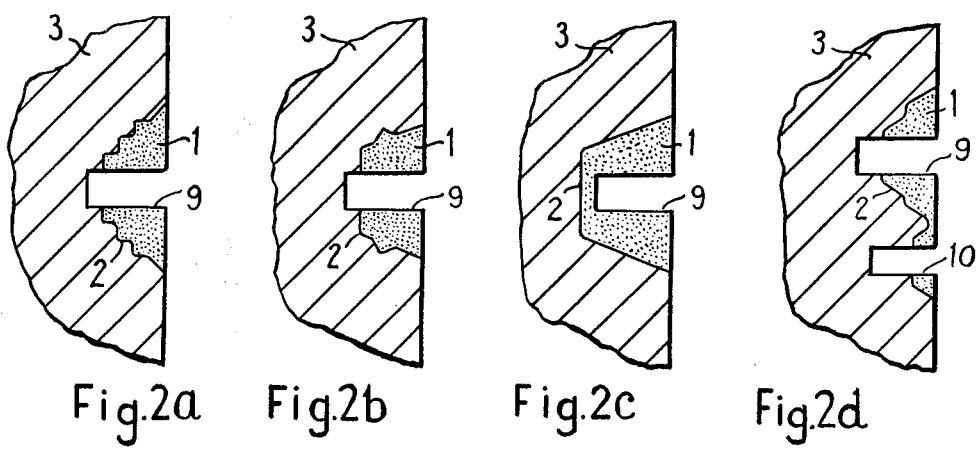
FIGS. 2a through 2d illustrate various geometries of reinforced piston ring grooves which may be produced by the method of the invention.

FIG. 2a is a section through a piston ring groove 9 reinforced by a sprayed deposit 1 of hard metallic material within the recess 2. FIG. 2b shows an alternative shape for the recess 2 in which the hard material is deposited. FIG. 2c shows an embodiment wherein the recess 2 is of sufficient depth that the subsequently machined groove 9 does not extend right through the deposit 1. FIG. 2d illustrates a form wherein the recess 2 containing the deposit 1 extends over a region sufficient to reinforce two adjacent ring grooves 9 and 10.

Some specific examples of carrying out the method according to the invention will now be given.

EXAMPLE 1

An aluminium alloy piston was provided with an aluminium bronze/stainless steel reinforcement of the top ring groove, as follows. At a convenient stage of manufacture a groove was machined into the piston periphery to receive the sprayed deposit. The piston was degreased, grit-blasted with alumina grit, and warmed to ensure the removal of surface contaminants (about 90°C), in the region of the groove. A sprayed pseudo-alloy deposit was then applied using an electric-arc gun operated with aluminium bronze as the anode wire and stainless steel as the cathode wire. An air pressure of 40 p.s.i. (280 kN/m$^2$) and an arc voltage of 42 volts was used to apply the initially-deposited layers and an air pressure of 65 p.s.i. (450 kN/m$^2$) and an arc voltage of 30 volts to apply subsequent layers. The surplus sprayed material was removed by machining and the piston was finished in the usual manner, the top ring groove being machined through the sprayed reinforcement, (as in FIG. 2a).

EXAMPLE 2

A piston was manufactured generally as in Example 1 except that the piston was first warmed to about 125°C, to ensure the removal of surface contaminents and to reduce stress in the final coating, and the arc voltage was maintained at 27 volts through-out the spraying operation. The air pressure was controlled at 45 p.s.i. (310 kN/m$^2$) to apply the initial layers of sprayed deposit and 70 p.s.i. (480 kN/m$^2$) to apply subsequent layers.

EXAMPLE 3

A piston was provided with the top and second ring grooves reinforced with phosphor bronze/stainless steel, generally as in Example 1 but with the spraying carried out as follows. The piston was grooved generally as in FIG. 2d to receive the sprayed deposit, grit-blasted and warmed to about 125°C. A bond coat of aluminium bronze of about 0.003 in. (0.08 mm) thickness was then applied using an electric-arc gun operated at an arc-voltage of 28 volts and an air pressure of 45 p.s.i. (310 kN/m$^2$). The wear-resistant deposit was then built-up with an electric-arc gun operated at an arc voltage of 27–28 volts and an air pressure of 70 p.s.i. (480 kN/m$^2$) one electrode being of phosphor and the other of stainless steel.

EXAMPLE 4

Several plain aluminium alloy piston bodies were electric-arc sprayed with different materials to enable a comparison of coating bond strength to be made with a coating applied to a substantially pre-heated piston with an oxygen/combustion gas metallising gun using a separate bond-coat. In each case the coating was applied to the plain peripheral face of the piston, the deposit being subsequently machined so as to leave bands of coating in a form suitable for shear strength tests to be carried out on the region of the interface.

Piston bodies were grit-blasted, warmed to 75°C, and electric-arc sprayed at an arc voltage of 27–28 volts throughout. An air pressure of 45 p.s.i. (310 kN/m$^2$) was used to apply the initially deposited layers and an air pressure of 70 p.s.i. (480 kN/m$^2$) to apply subsequent layers. Using aluminium bronze throughout for both anode and cathode a bond shear strength of 48.0 MN/m$^2$ was obtained. Using bronze throughout for the anode and steel for the cathode, a value of 40.5 MN/m$^2$ was obtained for an aluminium bronze/stainless steel mixture and a value of 44.0 MN/m$^2$ for a phosphor bronze/low carbon steel mixture. A further piston body was arc-sprayed in two stages after grit-blasting and then warming to 75°C, as before. A bond coat of aluminium bronze of about 0.005 in. (0.13 mm) thickness was first applied at an arc voltage of 28 volts and an air pressure of 45 p.s.i. (310 kN/m$^2$), and then a build-up coating of stainless steel applied at an arc voltage of 28 volts and an air pressure of 70 p.s.i. (480 kN/m$^2$). A bond shear strength of 51.1 MN/m$^2$ was recorded.

For the purposes of comparison, further bodies were grit-blasted, pre-heated to 180°–200°C and sprayed in two stages using a standard oxyacetylene metallising gun. A bond coat of about 0.005 in. (0.13 mm) thickness of a proprietary nickel-aluminium composite (Metco 405) was first applied and the coating then built-up with stainless steel. A mean bond shear strength of 40.3 MN/m$^2$ was recorded.

MATERIALS

In examples 1–4 the spraying wires employed in the electric-arc guns were of the following nominal compositions:

Aluminium bronze — 9% aluminium, 1% iron, balance copper

Phosphor bronze — 7% tin, 0.1% phosphorus, balance copper

Stainless steel — 18% chromium, 8.5% manganese, 5% nickel, 0.15% max. carbon

Low carbon steel — 0.8% manganese, 0.1% carbon

The electric-arc guns employed in examples 1–4 were either "Metco" type RG electric-arc guns or Metallisation "Arcspray" guns type 200 or 400.

Although the examples are specifically directed to the reinforcement of piston ring grooves, it will be understood that the method of the invention may also be applied to the reinforcement of other regions of a piston, such as the piston skirt, piston crown or lands.

We claim:

1. A method of forming a deposit of a reinforcing material on an aluminium alloy piston which includes the step of spraying one or more regions of the piston with a copper-based material from an electric-arc spray gun whose operating arc voltage and gas pressure are adjusted to produce molten particles of a size, velocity and heat content sufficient to produce an effective metallurgical interaction with the aluminium alloy of the piston at a temperature below the boiling point of said alloy, whereby the copper-based material is bonded to said one or more regions of the piston.

2. A method as claimed in claim 1, wherein the copper-based material forms a bond coat and the deposit of reinforcing material is subsequently applied by a different spraying process.

3. A method as claimed in claim 1, wherein the piston is initially degreased and mechanically roughened in the region or regions where the deposit is to be formed.

4. A method as claimed in claim 1, wherein the piston is warmed prior to the electric-arc spraying operation to remove surface contaminants and/or to reduce stress in the coating.

5. A method as claimed in claim 1, wherein relative movement is effected between the piston and the electric-arc spray gun or guns during the spraying operation 6. A method as claimed in claim 5, wherein the or each spray gun is oscillated so as to incline it to the piston at a continuously varying angle throughout the spraying operation.

7. The method as claimed in claim 1, wherein the piston is provided with a recess in the region of the or each ring groove to be reinforced, the reinforcing material is deposited in the or each recess, and a ring groove is subsequently cut into or through the deposit.

8. A method as claimed in claim 1, wherein the copper-based material is both a bonding material and the reinforcing material and the molten copper-based material produced by the electric arc is projected by a stream of gas and is initially sprayed at a relatively low gas pressure not substantially exceeding 45 p.s.i., and then subsequently sprayed at a higher gas pressure of at least 65 p.s.i., so that the initially sprayed material is deposited under conditions providing good adhesion to the piston alloy and the subsequent portion of the deposit is sprayed under conditions providing good interparticle cohesion, machinability and wear-resistance.

9. A method as claim in claim 8, wherein the arc voltage for the initially sprayed material is of the order of 40 volts and the arc voltage for the subsequently sprayed material is of the order of 30 volts.

10. The method as claimed in claim 1, wherein the electric-arc spray gun has a pair of arc electrodes and wherein one electrode of the electric-arc spray gun is composed of a material selected from aluminium bronze, phosfor bronze or copper-nickel alloy.

11. The method as claimed in claim 10, wherein the other electrode of the electric-arc spray gun is composed of a material selected from aluminium bronze, copper-nickel alloy or stainless steel, or a low carbon steel.

* * * * *